(12) United States Patent
Ochiai et al.

(10) Patent No.: US 6,879,888 B2
(45) Date of Patent: Apr. 12, 2005

(54) VEHICLE DRIVE APPARATUS, METHOD AND COMPUTER PROGRAM

(75) Inventors: Shinobu Ochiai, Saitama (JP); Yasumichi Ohnuki, Saitama (JP); Atsushi Shibutani, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/242,690

(22) Filed: Sep. 13, 2002

(65) Prior Publication Data

US 2003/0088343 A1 May 8, 2003

(30) Foreign Application Priority Data

Nov. 5, 2001 (JP) ........................................ 2001-339153

(51) Int. Cl.[7] ............................ G06F 19/00; G06F 7/00
(52) U.S. Cl. ........................ 701/22; 701/102; 180/243; 180/65.2; 180/65.3; 318/139; 318/459; 290/40 A; 290/40 B; 290/40 C
(58) Field of Search .............................. 701/69, 22, 70, 701/102; 180/243, 65.2, 65.4, 65.3; 318/139, 151, 459; 290/40 A, 40 B, 40 C

(56) References Cited

U.S. PATENT DOCUMENTS

| | | | | |
|---|---|---|---|---|
| 4,305,254 A | * | 12/1981 | Kawakatsu et al. | 60/716 |
| 6,077,186 A | * | 6/2000 | Kojima et al. | 477/3 |
| 6,166,449 A | * | 12/2000 | Takaoka et al. | 290/40 B |
| 6,247,437 B1 | * | 6/2001 | Yamaguchi et al. | 123/179.3 |
| 6,278,195 B1 | * | 8/2001 | Yamaguchi et al. | 290/40 A |
| 6,459,980 B1 | * | 10/2002 | Tabata et al. | 701/70 |
| 6,504,327 B1 | * | 1/2003 | Omata et al. | 318/139 |
| 6,549,840 B1 | * | 4/2003 | Mikami et al. | 701/69 |

FOREIGN PATENT DOCUMENTS

| | | |
|---|---|---|
| JP | 11-153075 | 6/1999 |
| JP | 11-187577 | 7/1999 |
| JP | 2000-125414 | 4/2000 |
| JP | 2000-238555 | 9/2000 |

* cited by examiner

*Primary Examiner*—Thomas G. Black
*Assistant Examiner*—Ronnie Mancho
(74) *Attorney, Agent, or Firm*—Arent Fox PLLC

(57) ABSTRACT

The object of the present invention is to provide a vehicle drive system which enables setting of appropriate start-up torque and restraining of progress of battery deterioration. A vehicle drive apparatus having an electric motor, which is driven with electricity supplied by a battery, for driving a vehicle or assisting it while driven by an engine includes: a temperature sensor for detecting the battery temperature, an discharge power upper limit setting means for setting an upper limit for discharge power of the battery depending on the battery temperature, a discharge power computing means for computing battery discharge power, a revolution speed sensor for detecting a revolution speed of the engine, a basic start-up torque setting means for setting basic start-up torque requirement depending on the revolution speed and a start-up torque adjust means for decreasing the start-up torque requirement if the discharge power exceeds the discharge power upper limit during engine start-up.

10 Claims, 5 Drawing Sheets

(TIME CHART 2)

US 6,879,888 B2

VEHICLE DRIVE APPARATUS, METHOD AND COMPUTER PROGRAM

FIELD OF THE INVENTION

The present invention relates to a vehicle drive apparatus, a method and a computer program thereof, which are applied to a vehicle that an electric motor energized with electricity supplied by an electricity storage reservoir such as a battery drives or assists while powered by an internal combustion engine.

BACKGROUND OF THE INVENTION

A hybrid vehicle on which an engine (internal combustion engine), a motor (generator motor) for driving and regenerating and a battery (electricity storage reservoir) has been known. In the hybrid vehicle, which the motor starts up the engine, start-up torque of the motor has been determined based on the engine temperature (cooling water temperature) conventionally. Such conventional engine start-up control as this has the problem that a battery deterioration is likely to be hastened due to a heavy load caused by excessive current extraction when electricity is supplied to the motor from the battery for starting up the engine while it is cool. In connection with this problem Japan Laid-Open Patent 11-153075 discloses a technique (start-up control apparatus for an internal combustion engine) which restrains an excessive load from acting on a battery by controlling the output torque of a motor to be smaller as the engine temperature falls.

However, the start-up control apparatus fails in starting up an engine due to unnecessary output restriction or causes reduction in the quality of the engine exhaust gas emissions even if engine start-up is successful, when an engine temperature is low while a battery temperature is not low. On the other hand, when the engine temperature is high while the battery temperature is low, acceleration of battery deterioration occurs since undesired excessive electricity is extracted from the battery without appropriate output restriction.

SUMMARY OF THE INVENTION

The object of the present invention is to provide a vehicle drive system which enables setting of appropriate start-up torque and restraining of battery deterioration progress.

The first aspect of the present invention to assess the problems described above provides a vehicle drive apparatus having an electricity storage reservoir and an electric motor, which is driven with electricity supplied by the electricity storage reservoir, for driving a vehicle or assisting it while driven by an internal combustion engine. The apparatus includes the following means: a temperature detecting means for detecting a temperature of the electricity storage reservoir, an upper limit setting means for setting an upper limit for discharge power of the electricity storage reservoir depending on the temperature, a power detecting means for detecting the discharge power of the electricity storage reservoir, a revolution speed detecting means for detecting a revolution speed of the internal combustion engine or electric motor, a torque setting means for setting torque requirement for the electric motor depending on the revolution speed and a torque decreasing means for decreasing the torque requirement in case the discharge power is more than the upper limit when the internal combustion engine is started up by the electric motor.

In this way the upper limit can be set depending on the electricity storage reservoir temperature. The torque requirement is decreased when the discharge power exceeds the upper limit while a vehicle is started up. The discharge power of the electricity storage reservoir is thus decreased. Therefore, the discharge power during vehicular start-up can be controlled appropriately depending on the electricity storage reservoir temperature.

The second aspect of the present invention provides a vehicle drive apparatus, which further includes a torque increasing means for increasing the torque requirement in case the discharge power is not more than the upper limit.

When start-up torque is insufficient, an internal combustion engine cannot be started up. In this connection, since the magnitude of start-up torque generated by a generator motor serving as a starter depends on the amount of power discharged by the electricity storage reservoir, the start-up torque will be smaller as the discharge power decreases. However in the present invention, the start-up torque will be increased by increasing the torque requirement when the discharge power becomes smaller than the upper limit. In other words, the torque requirement is increased since the battery deterioration will not be promoted as long as the discharge power is less than the upper limit. In this way reliable starting up of an internal combustion engine can be achieved.

The third aspect of the present invention provides a vehicle drive apparatus, which further includes a torque adjusting means for one of increasing and decreasing of the torque requirement gradually.

Gradual decrease or increase of torque requirement is performed in this aspect of invention. It will prevent the motor torque from dropping steeply during an internal combustion engine start-up, thereby allowing a reliable start-up.

The fourth aspect of the present invention provides a vehicle drive apparatus, which further includes a torque enhancing means for enhancing the torque requirement above a value restricted by the upper limit for discharge power.

An internal combustion engine start-up by a motor can be performed reliably since the start-up torque generated by the motor is increased in this aspect of invention. For example, start-up performance for low temperature can be improved.

The fifth aspect of the present invention provides a computer program for a computer of a vehicle drive apparatus which has an electricity storage reservoir and an electric motor, which is driven with electricity supplied by the electricity storage reservoir, for driving a vehicle or assisting it while driven by an internal combustion engine. The computer program executes the computer in a process including: (1) setting an upper limit for discharge power of the electricity storage reservoir depending on a temperature entered by a temperature detecting means for detecting the temperature of the electricity storage reservoir, (2) setting torque requirement for the electric motor depending on a revolution speed entered by a revolution speed detecting means for detecting the revolution speed of the internal combustion engine or electric motor and (3) decreasing the torque requirement in case the discharge power entered by a power detecting means for detecting the discharge power of the electricity storage reservoir is more than the upper limit, when the internal combustion engine is started up by the electric motor.

The computer program is stored in a storage medium connected to a computer on board a vehicle. Since this computer reads out the program and executes control process, it can control the vehicle drive apparatus so that starting up of an internal combustion engine by a motor can be performed along with restricting battery deterioration.

DESCRIPTION OF THE PREFERRED EMBODIMENTS

An embodiment of the present invention will now be described in detail referring to the accompanying drawings.

Figure 1:
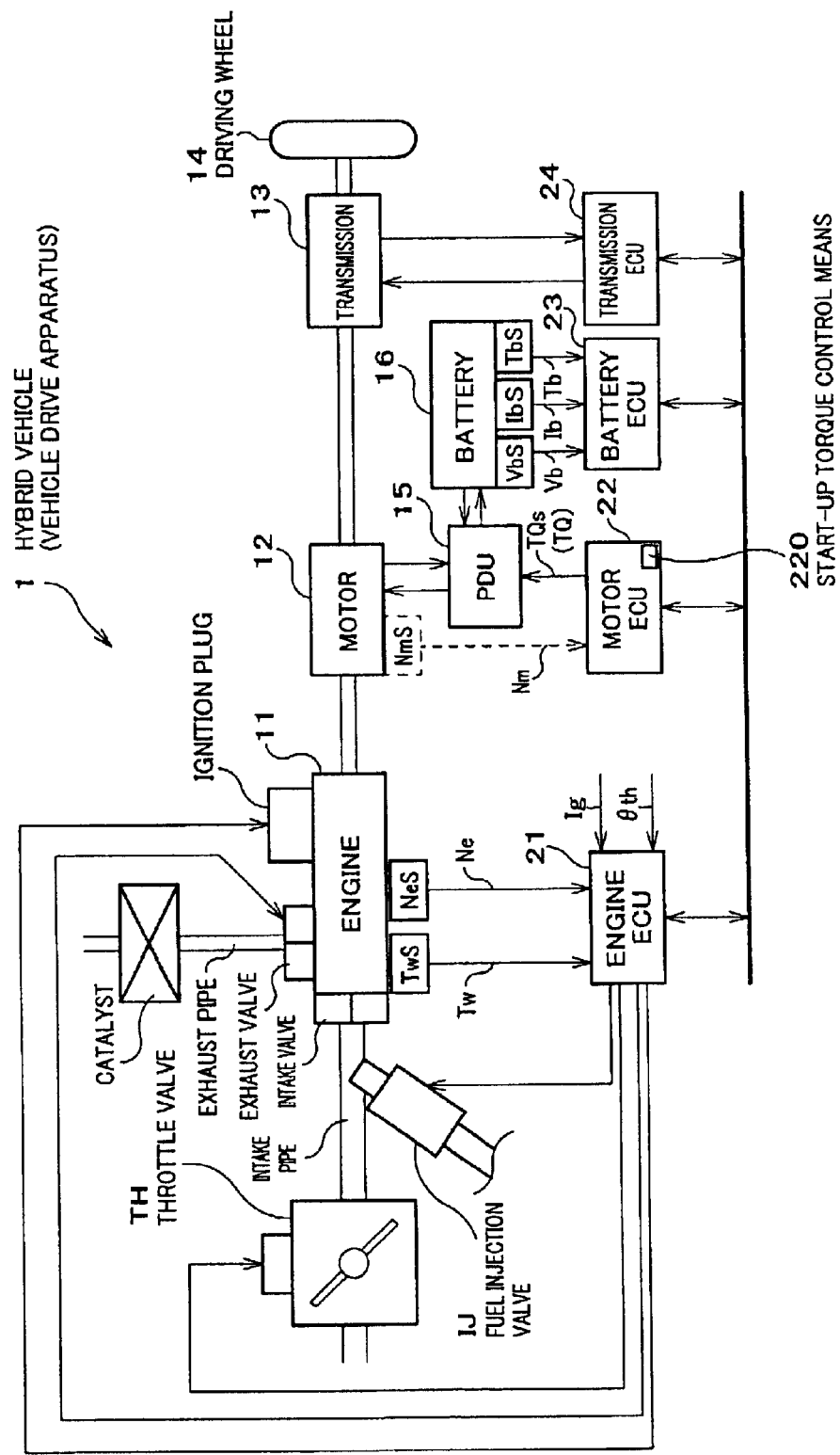
FIG. 1 is a block diagram showing an overall structure of the driving line of a hybrid vehicle to which the vehicle drive apparatus according to the present invention is applied.

FIG. 1 is a block diagram showing an overall structure of the drive line of a hybrid vehicle including the vehicle drive apparatus.

a. Hybrid Vehicle

A hybrid vehicle 1 shown in FIG. 1 includes an engine 11, a motor 12, a transmission 13, driving wheels 14, a Power Drive Unit (PDU) 15, a battery 16, an engine Electric Control Unit (ECU) 21, a motor ECU 22, a battery ECU 23 and a transmission ECU 24. The vehicle drive apparatus of the present invention is applied to a drive line of the hybrid vehicle 1.

As shown in FIG. 1, the engine 11 of the hybrid vehicle 1 and the motor 12 are coupled with a rotation axis. The motor 12 is responsible for starting up the engine 11, assisting the power of engine 11 depending on the vehicle operating conditions, generating electricity by the regenerative energy produced by regenerative action during vehicle braking and generating electricity by the power of engine 11 depending on the vehicle operating conditions. The motor 12 is a generator motor serving not only as a motor but also as a generator. The transmission 13 changes the revolution speed of the rotation axis of engine 11 and motor 12 at a predetermined transmission gear ratio, transmitting the driving force generated by engine 11 and/or motor 12 to the driving wheels 14 through a differential gear unit (not shown) located in the latter stage. The transmission 13 and the differential gear unit (not shown) are, on the other hand, responsible for transmitting regenerative driving force from the driving wheels 14 to the motor 12 during vehicle braking. The engine 11, which is an internal combustion engine with fuel such as gasoline, sucks in through an intake valve a mixture of fuel injected through a fuel injection valve IJ and air through a throttle valve TH and burns it by igniting with an ignition plug. Combustion gas is exhausted after catalytic conversion through an exhaust valve and an exhaust pipe.

PDU 15 comprising an inverter drives the motor 12 supplied with electricity from the battery 16 for an assist mode, in which the motor 12 assists the internal combustion engine 11 which drives the hybrid vehicle 1. On the other hand, PDU 15 charges the battery 16 with electricity generated by the motor 12 for a regenerative mode. The inverter is, for example, a Pulse Width Modulation (PWM) inverter, having a bridge circuit (not shown) made of plural switching elements. In this connection, PDU 15 performs both driving and regenerating of the motor 12 receiving a torque requirement TQ generated by the motor ECU 22.

The battery (high voltage battery) 16 is a stacked battery, which comprises several pieces of nickel hydrogen battery. When the motor 12 is driven by electricity stored in the battery 16, it is supplied to the motor 12 from the battery 16 through PDU 15 controlled by the motor ECU 22 (discharge). When the motor 12 generates electricity, on the other hand, the generated electric energy is stored in the battery 16 through PDU 15 controlled by the motor ECU 22 (charge).

b. ECU (Control Microcomputer)

The engine ECU 21 receives an ignition signal from an ignition switch SW (not shown), a throttle angle θth from a throttle angle sensor mounted on a throttle pedal (not shown), a revolution speed Ne from a revolution speed sensor NeS of the engine 11 and an engine cooling water temperature Tw from a cooling water temperature sensor TwS of the engine 11. It also determines the injection amount for a fuel injection valve IJ, the angle for a throttle valve TH, an angle for exhaust valve and ignition timing and sends the injection amount to the fuel injection valve IJ, for example.

The motor ECU 22 determines the torque requirement TQ to drive the motor 12 for a normal mode and a start-up torque requirement TQs for starting up the engine 11 while it communicates with other ECUs 21, 23 and 24, sending them to PDU 15. In this connection, a revolution speed Nm detected by a revolution speed sensor NmS, which is mounted on the motor 12 as shown in FIG. 1 by a broken line, may be added. Numeral 220 refers to a start-up torque control means which controls the start-up torque requirement TQs for starting up the engine 11. A detail description will be given for this start-up torque control means 220 later.

The battery ECU 23 receives a current Ib, a voltage Vb and a battery temperature Tb detected by a current sensor IbS, a voltage sensor VbS and a temperature sensor TbS of the battery 16, respectively, communicating with other ECUs 21, 22 and 23. The transmission ECU 24 receives a position signal (not shown) from a shift lever (not shown) and an oil pressure signal of the transmission 13 and determines an oil pressure requirement, sending it to the transmission 13 communicating with other ECUs 21, 22 and 23.

The hybrid vehicle 1 can generate driving force with both engine 11 and the motor 12 during acceleration. It generates driving force with only the engine 11 during cruising. In addition, the motor 12 generates electricity which is stored in the battery 16 during deceleration (regeneration). In this way, this hybrid vehicle 1 can utilize the engine 11 efficiently. It also enables efficient use of the regenerative energy regenerated by the motor 12. Further, the motor 12 can start up the engine 11 utilizing electricity stored in the battery 16 during start-up.

c. Start Up Torque Control Means

Figure 2:
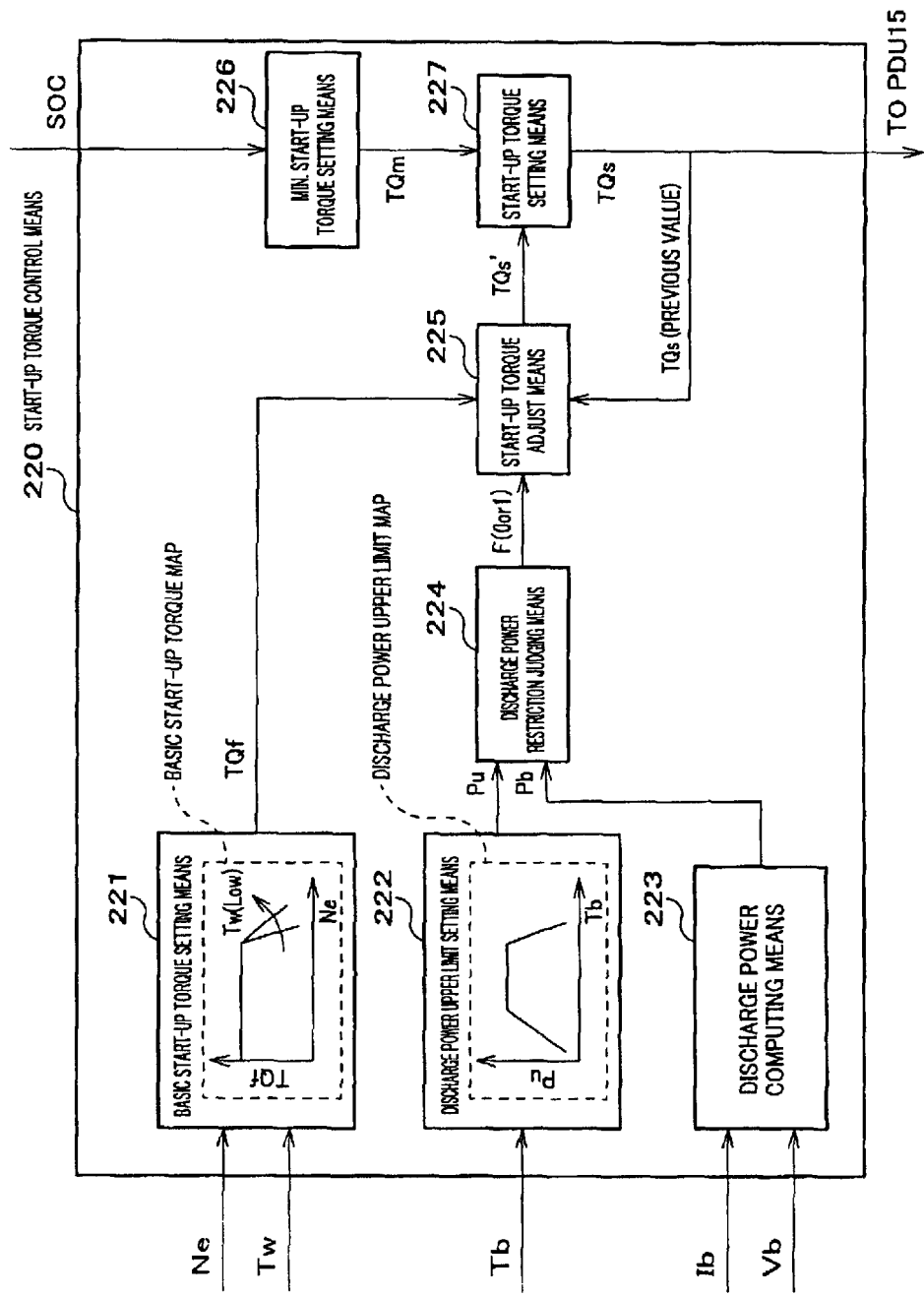
FIG. 2 is a block diagram showing functional deployment of the start-up torque control means shown in FIG. 1.

The start-up torque control means 220, which controls start-up torque requirement for the motor 12 serving as a starter during start-up, will be described referring to FIG. 2. FIG. 2 is a block diagram showing functional deployment of the start-up torque control means.

As shown in FIG. 2, the start-up torque control means 220 includes a basic start-up torque setting means 221, a discharge power upper limit setting means 222, a discharge power computing means 223, a discharge power restriction judging means 224, a start-up torque adjust means 225, a minimum start-up torque setting means 226 and a start-up torque setting means 227. The start-up torque control means 220 is basically a computer program executed in the motor ECU 22, but it goes without saying that the means 220 can be decentralized to be executed in each of ECUs 21, 23 and 24. The means 220 may also be configured as hardware instead of a computer program.

Each component of the start-up torque control means 220 will be described below.

The basic start-up torque setting means 221 shown in FIG. 2 receives the revolution speed Ne of engine 11 detected by the engine revolution speed sensor NeS and the engine cooling water temperature Tw detected by the cooling water temperature sensor TwS and determines a basic start-up torque requirement TQf. For this reason, the means 221 has a map which defines the basic start-up torque requirement TQf based on the revolution speed Ne and the engine cooling water temperature Tw. As shown in FIG. 2, the map (basic start-up torque map) is so arranged that TQf is set to be a constant large value for the low region of revolution speed Ne and smaller as Ne increases for the high region of revolution speed Ne. The reason for it is that the start-up torque requirement TQs (basic start-up torque requirement TQf) doesn't need to be kept large since starting up of the engine 11 is completed once the revolution speed Ne reaches some high value. This map is designed based on theoretical calculation and experiment. The basic start-up torque requirement TQf determined by the basic start-up torque setting means 221 is sent to the start-up torque adjust means 225 in the latter stage.

Figure 3:
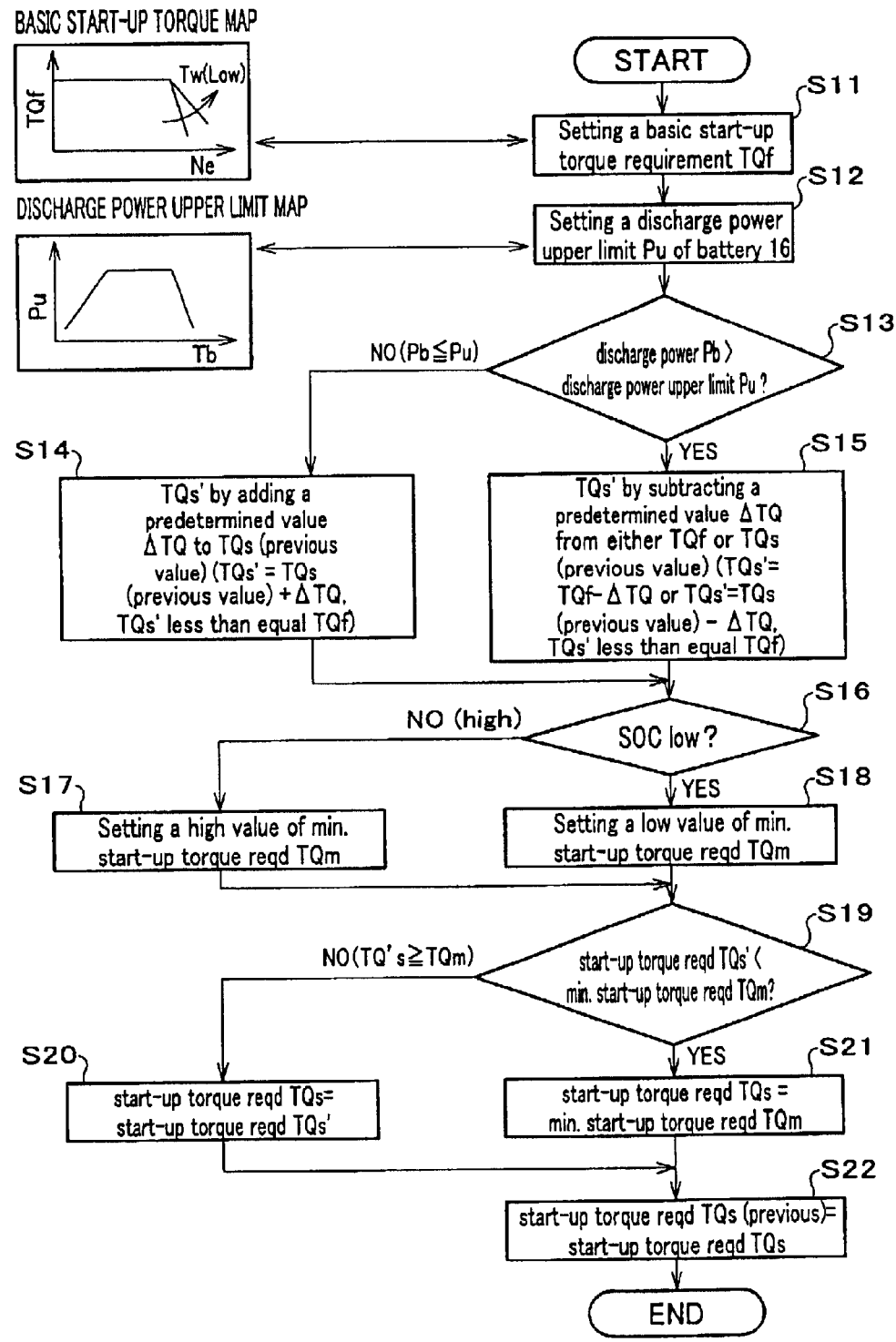
FIG. 3 is a flow chart describing operation of the start-up torque control means shown in FIG. 2.

In the basic start-up torque map shown in FIGS. 2 and 3, a revolution speed Ne at which the basic start-up torque requirement TQf starts decreasing is, for example, about 500 through 800 rpm. On the other hand a revolution speed Ne at which TQf is set to be zero depends on the engine cooling water temperature Tw. For example, TQf is held above zero until the engine revolution speed Ne reaches about 1500–2000 rpm to improve starting up of the engine 11 for low Tw conditions. On the other hand, TQf is set to be zero when the revolution speed Ne is around, e.g. 1000 rpm, for high Tw conditions.

The revolution speed Ne of engine 11 according to the embodiment enters the basic start-up torque setting means 221 through the engine ECU 21. In this connection, the revolution speed Nm of the motor 12, which the additional revolution speed sensor NmS (see the broken line in FIG. 1) detects, may be adopted. The revolution speeds Ne and Nm have the same value when the engine 11 and the motor 12 are directly coupled without a transmission mechanism.

The discharge power upper limit setting means 222 receives the battery temperature Tb detected by the battery temperature sensor TbS and sets a discharge power upper limit Pu for the battery 16. The means 222 has a map which defines the discharge power upper limit Pu depending on the battery temperature Tb. As shown in FIG. 2, this map (discharge power upper limit map) is so arranged that Pu is set to be small when Tb is low. It is for protecting the battery 16 against overdischarge in order to prevent the deterioration. The map is also so arranged that Pu is set to be small when Tb is high. It is for preventing the deterioration of battery 16 caused by the transitionally increasing battery temperature Tb if the battery 16 discharges while Tb is high. In this connection, this map is designed based on theoretical calculation and experiment.

The discharge power upper limit Pu set by the discharge power upper limit setting means 222 is sent to the discharge power restriction judging means 224 in the latter stage.

The discharge power computing means 223 receives the current Ib (discharge current) detected by the current sensor IbS and the voltage Vb (discharge voltage) detected by the voltage sensor VbS, computing a discharge power Pb which is extracted from the battery 16. The means 223 has multiplication function for that. The discharge power Pb computed by this means 223 is sent to the discharge power restriction judging means 224 in the latter stage.

The discharge power restriction judging means 224 compares the discharge power Pb with the discharge power upper limit Pu and sets [0 (increase command)] for a torque adjust flag F when Pb is not more than Pu (Pb≦Pu). On the other hand, it sets [1 (decrease command)] for the torque adjust flag F when Pb is more than Pu (Pb>Pu). For this reason, the means 224 has a comparison function, a flag setting function, etc. The torque adjust flag F is sent to the start-up torque adjust means 225.

The start-up torque adjust means 225 receives the torque adjust flag F set by the discharge power restriction judging means 224 as well as the basic start-up torque requirement TQf set by the basic start-up torque setting means 221 and the start-up torque requirement TQs (previous value). When the torque adjust flag F is [0 (increase command)], the means 225 increases the start-up torque requirement TQs (previous value) by adding a predetermined value step by step under the conditions that TQs doesn't exceed the basic start-up torque requirement TQf (TQs'=TQs(previous value)+ΔTQ, TQs'≦TQf). When the torque adjust flag F is [1 (decrease command)] on the other hand, the means 225 decreases the lower one, either the basic start-up torque requirement TQf or the start-up torque requirement TQs (previous value), by subtracting a predetermined value step by step (TQs'=TQf−ΔTQ or TQs'=TQs (previous value)−ΔTQ).

The start-up torque adjust means 225 has a branch function, a comparison function, an addition function and a subtraction function. The start-up torque requirement TQ's after adjustment is sent to the start-up torque setting means 227.

The minimum start-up torque setting means 226 receives a State Of Charge (SOC: battery residual capacity) signal and sets a minimum start-up torque requirement TQm in the following manner: a relatively small TQm for low SOC and a relatively large TQm for high SOC, respectively. For this reason, the means 226 has a binary coding (quantization) function and a minimum start-up torque table which stores two kinds of minimum start-up torque requirement for the two binary coded SOCs, respectively. The minimum start-up torque requirement TQm is sent to the start-up torque setting means 227 in the latter stage.

The start-up torque setting means 227 receives the start-up torque requirement TQs' and the minimum start-up torque requirement TQm. If TQs' is less than TQm, the means 227 sets TQm as a final start-up torque requirement TQs (TQs=TQm). On the other hand if TQs' is not less than TQm, the means 227 automatically sets TQs' as a final start-up torque requirement TQs(TQs=TQs'). In this way an undesirable situation in which the engine 11 cannot be successfully started up due to an inappropriately small TQs can be prevented. The means 227 has a comparison function and a data replacement function for that. The finalized start-up torque requirement TQs is sent to PDU 15, thereby driving the motor 12. The motor 12 then starts up the engine 11. The start-up torque requirement TQs is also sent to the start-up torque adjust means 225 as a start-up torque requirement TQs (previous value).

d. Operation of Vehicle Drive Apparatus

The operation of the aforementioned vehicle drive apparatus will be described with the flow chart shown in FIG. 3, referring to FIGS. 1 and 2.

FIG. 3 is a flow chart describing operation of the start-up torque control means shown in FIG. 2.

A driver turns on the ignition switch SW (not shown) of the hybrid vehicle 1 first. An ignition signal Ig thus enters the engine ECU 21. The engine ECU 21 then sends an engine start-up command to the motor ECU 22 immediately. The motor ECU 22 (start-up torque control means 220) sets a start-up torque requirement TQs for the motor 12 in order to start up the engine 11. The execution of processes shown in FIG. 3 will be started accordingly.

At step S11 a basic start-up torque requirement TQf for driving the motor 12 is set. The basic start-up torque setting means 221 determines TQf by map searching entering the revolution speed Ne and the engine cooling water temperature Tw as input. A high value is set for TQf since Ne equals zero at first. In this connection, the start-up torque requirement TQs sent to PDU 15 is the final value, which is obtained by exerting a predetermined process on the basic start-up torque requirement TQf.

The flow chart shown in FIG. 3 is executed repeatedly in a short period of time at predetermined short intervals. The revolution speed Ne equals zero for the first execution of the flow chart but a higher revolution speed Ne than the previous one appears for the subsequent execution.

At step S12 the discharge power upper limit setting means 222 determines the discharge power upper limit Pu for battery 16. As the discharge power upper limit map shows, Pu is set to be smaller as the battery temperature Tb decreases for the low temperature region. In this way, the means 222 limits the current (power) extracted from the battery 16, thereby restricting deterioration of the battery 16. On the other hand, Pu is also set to be smaller as Tb increases for the high temperature region. In this way the discharge power upper limit Pu is determined appropriately depending on the battery temperature Tb and thereby deterioration of the battery 16 is restricted.

At step S13 the discharge power restriction judging means 224 judges if the discharge power Pb of battery 16 exceeds the discharge power upper limit Pu (Pb>Pu) determined at step S12. Pb is calculated by the discharge power computing means 223 entering the current Ib and the voltage Vb extracted from the battery 16.

If Pb is not more than Pu (NO) at step S13, at step S14 the start-up torque adjust means 225 shown in FIG. 2 computes a start-up torque requirement TQs' by adding a predetermined value to the start-up torque requirement TQs (previous value) under the conditions that TQs' doesn't exceed the basic start-up torque requirement TQf (TQs'= TQs (previous value) +ΔTQ, TQs'≦TQf).

On the other hand if Pb is more than Pu (YES) at step S13, at step 15 the means 225 computes a start-up torque requirement TQs' by subtracting a predetermined value from the smaller one, either the basic start-up torque requirement TQf or the start-up torque requirement TQs (previous value) (TQs'=TQf−ΔTQ or TQs'=TQs (previous value)−ΔTQ, TQs'≦TQf).

The minimum start-up torque setting means 226 judges whether or not SOC (battery residual capacity) of battery 16 is low at step S16. If SOC is high (NO), the means 226 sets a high value of the minimum start-up torque requirement TQm at step S17. On the other hand if SOC is low (YES), the means 226 sets a low value of TQm at step S18 in order to protect against a large amount of the power (current) extracted from the battery 16.

The start-up torque setting means 227 judges whether or not the starting torque requirement TQs' is less than the minimum start-up torque requirement TQm (TQs'<TQm) at step S19. If TQs' is not less than TQm (NO), the means 227 automatically sets TQs' for TQs (TQs=TQs') at step S20. On the other hand if TQs' is less than TQm (YES), the means 227 sets TQs for TQm (TQs=TQm) at step S21.

The motor 12 can generate the minimum start-up torque for the engine 11 through the processes at S16–S21 depending on the high/low state of SOC. In this way the energy required for starting up the engine 11 can be maintained. Therefore, the engine 11 can be started up by the motor 12 reliably and deterioration of the battery 16 can be restricted as well. Also the quality of the engine exhaust emissions can be improved.

At step S22 the means 227 sends the start-up torque requirement TQs determined at the previous steps to PDU 15 and stores it for the next execution of the flow.

The flow chart is executed repeatedly until the engine 11 has been started up. When the second execution of the flow chart and the subsequent ones are performed, the revolution speed Ne, the discharge power Pb and the start-up torque requirement TQs (previous value) will be updated.

e. Time Chart

The operation of the vehicle drive apparatus will be described with the time chart shown in FIG. 4, referring to FIGS. 1–3.

Figure 4:
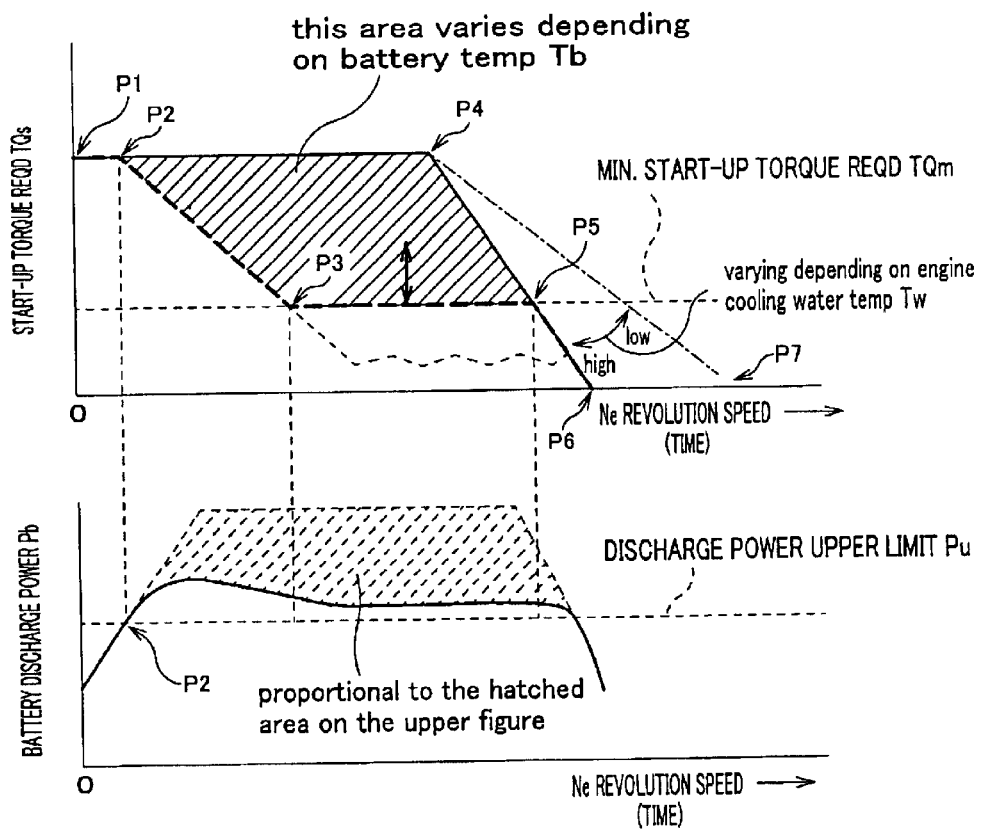
FIG. 4 is time chart 1 which shows execution of an operation according to the flow chart shown in FIG. 3: the upper figure shows history of the start-up torque requirement and the lower one that of the battery discharge power.

FIG. 4 referred to as time chart 1 represents the execution of an operation according to the flow chart shown in FIG. 3. An upper figure shows a history of the start-up torque requirement and the lower one a history of the discharge power. In this connection, the revolution speed Ne on this time chart 1 is directly proportional to the elapsed time approximately. Also a start-up torque requirement TQs shown by a solid line is in accord with a value on the basic start-up torque map shown in FIGS. 2 and 3 (corresponding to the case without controlling of the start-up torque requirement).

First at P1 in FIG. 4, the ignition switch SW is turned on. Since the engine 11 is not started up and the revolution speed Ne is zero, a higher value of the basic start-up torque requirement TQf on the basic start-up torque map shown in FIG. 2 is set for the start-up torque requirement TQs automatically. The processes performed here correspond to those at S11 and S12 of the flow chart shown in FIG. 3.

Since the discharge power Pb of the battery 16 reaches the discharge power upper limit Pu at P2 (see the lower figure in FIG. 4), decreasing of either the basic start-up torque requirement TQf or the start-up torque requirement TQs' by the start-up torque adjust means 225 is initiated. The start-up torque requirement TQs then starts decreasing gradually as shown by a bold broken line on the upper figure. The discharge power Pb of the battery 16 starts accordingly decreasing or leveling off as shown in the lower figure. The processes done here correspond to those at S13 and S15 of the flow chart shown in FIG. 3. In this connection the battery temperature Tb is assumed to be low for the time chart 1. If the predetermined ΔTQ at S15 in FIG. 3 is increased, the slope of decreasing will be steeper.

At P3 (see the upper figure in FIG. 4), starting up of the engine 11 will be unstable if the start-up torque requirement TQs (TQs') falls to be less than the minimum start-up torque requirement TQm. Also the quality of the engine exhaust emissions will be deteriorated. For this reason, the minimum start-up torque requirement TQm is set for the start-up torque requirement TQs. In this way the start-up torque requirement TQs can be prevented from being less than the minimum starting torque requirement TQm (see the bold broken line in the upper figure). The processes initiated at P3 correspond to those at S16–S21 of the flow chart in FIG. 3. In this connection SOC is assumed to be in a high state for the time chart 1.

Next at P4 (see the upper figure of FIG. 4) when the revolution speed Ne of engine 11 reaches a somewhat high value (e.g. 800–1000 rpm), the basic start-up torque requirement TQf defined by the basic start-up torque map shown in FIGS. 2 and 3 will start decreasing as the engine 11 start-up nears completion. Since the start-up torque requirement TQs (TQs') is, however, smaller than the basic start-up torque requirement TQf at this point, TQs keeps a small value shown by a bold broken line on the upper figure.

At P5 the basic start-up torque requirement TQf on the decrease is smaller than the start-up torque requirement TQs. TQf is then automatically set for TQs. TQs continues decreasing to P6 according to the basic start-up torque map. In this connection, if the engine cooling water temperature Tw is low as shown by a dashed line, the revolution speed Ne at which the start-up torque requirement TQs (the basic start-up torque requirement TQf) falls to zero will be larger than that of a high Tw case shown by a solid line. The engine 11 can thus be started up by the motor 12 reliably for difficult cold start-up conditions.

The hatched area shown in the time chart 1 (the area defined by P2, P3, P4 and P5 in the upper figure) varies depending on the battery temperature Tb. Specifically, the hatched area for low Tb conditions is larger than that for desirable Tb conditions since the start-up torque requirement TQs is controlled to be relatively small depending on the discharge power upper limit Pu determined by the discharge power upper limit map. In this way the power (current) extracted from the battery 16 is restricted and thereby the deterioration is restrained. On the other hand when the battery temperature Tb is high, the deterioration is restrained in the same manner. Therefore the power of battery 16 can be utilized appropriately for both hot and low battery temperatures Tb. Since the discharge power upper limit Pu determined by the discharge power upper limit map is based not on the engine cooling water temperature Tw but on the battery temperature Tb, the power of the battery 16 can be used much more appropriately, thereby restricting deterioration of the battery 16.

The present invention can thus solve the conventional problem that the engine 11 can not be started up properly due to an unnecessary restriction for the motor 12 or the reduction in the quality of the engine exhaust emissions while the engine 11 is successfully started up, as long as the battery temperature Tb of battery 16 is not low even if the engine cooling water temperature Tw of engine 11 is low. On the other hand under the conditions that Tw is high and Tb is low, the present invention can also solve the problem that deterioration of the battery 16 progresses faster by extracting power (current) forcefully from the battery 16 without an appropriate discharge power restriction. Further, it will be advantageous in terms of durability of a conventional backup self starting motor, which is a backup starter driven by a low voltage battery (not shown), since reliable starting up of the engine 11 by motor 12 reduces frequency in use of the starter.

As shown in S13 and S14 of FIG. 3, the start-up torque requirement TQs once beginning to decrease is increased with a predetermined value step by step within the basic start-up torque requirement TQf, when the discharge power Pb is not more than the discharge power upper limit Pu (Pb≦Pu). In this way, as shown by a bold broken line on the upper figure in FIG. 5, the start-up torque requirement TQs (TQs') goes up and down alternately. It means that the start-up torque requirement TQs will not continue decreasing.

Figure 5:
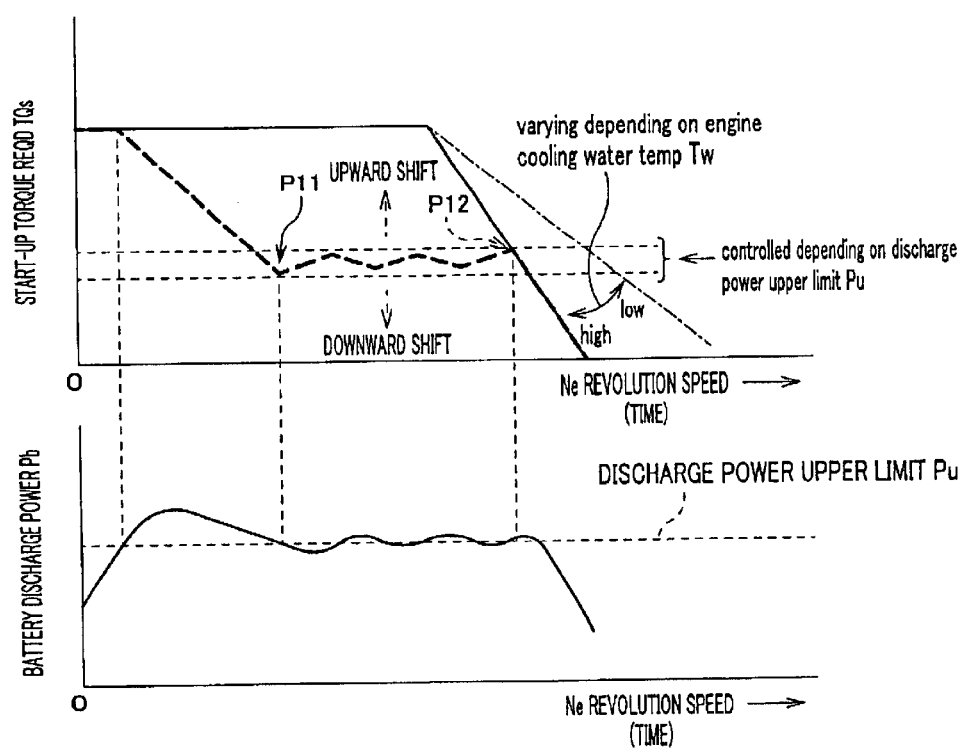
FIG. 5 is time chart 2 which complements time chart 1 shown in FIG. 4: the upper figure shows history of the start-up torque requirement and the lower one that of the battery discharge power.

On the time chart 2 in FIG. 5, the start-up torque requirement TQs for P11–P12 on the upper chart will shift upward if the discharge power upper limit Pu is large (upward shift). On the other hand it will shift downward if Pu is small (downward shift).

It will now be appreciated from the foregoing description that the present invention is not limited to the particularly illustrated embodiment discussed above and may be carried out in various modified forms.

For example, though increasing and decreasing of the start-up torque requirement TQs (previous value) and the basic start-up torque requirement TQf is performed with a predetermined value ΔTQ step by step having a slope for P2–P3 shown on the upper figure in FIG. 4, a vertical transition from P2 may be selected alternatively. Two types of the minimum starting torque requirement TQm are provided based on SOC but a single TQm can be adopted. In this case, the steps S16–S18 on the flow chart in FIG. 3 can be omitted. Also it may be possible to obviate the minimum start-up torque requirement TQm and the steps S19–S21 can then be further omitted. Also, it may be possible to omit the steps of increasing the start-up torque requirement TQs.

It may also be possible to maintain the voltage Vb of the battery 16 high by decreasing the start-up torque requirement TQs when the monitored Vb is less than the requirements. For example, the basic start-up torque requirement TQf or the start-up torque requirement TQs (previous value) is decreased by ΔTQ step by step when the voltage Vb becomes smaller than the requirements, according to the procedures at S13 and S15 of the flow chart in FIG. 3. Since the current Ib extracted from the battery 16 becomes smaller, the voltage Vb will recover to increase according to the I–V characteristics. In this way, deterioration of the battery 16 can be restricted.

Starting up of the engine 11 includes one from an idling stop, for example.

What is claimed is:

1. A vehicle drive apparatus comprising:

an electricity storage reservoir; and an electric motor, which is driven with electricity supplied by said electricity storage reservoir, for driving a vehicle or assisting said vehicle driven by an internal combustion engine, wherein said apparatus comprises:

a temperature detecting means for detecting a temperature of said electricity storage reservoir;

an upper limit setting means for setting an upper limit for discharge power of said electricity storage reservoir depending on said temperature;

a power detecting means for detecting said discharge power of said electricity storage reservoir;

a revolution speed detecting means for detecting a revolution speed of said internal combustion engine or electric motor;

a torque setting means for setting torque requirement for said electric motor depending on said revolution speed; and a torque decreasing means for decreasing said torque requirement from a current torque requirement value to a new torque requirement value greater than zero when said discharge power is more than said upper limit when said internal combustion engine is started up by said electric motor.

2. A vehicle drive apparatus according to claim 1, wherein said apparatus further comprises:

a torque increasing means for increasing said torque requirement in case said discharge power is not more than said upper limit.

3. A vehicle drive apparatus according to claim 2, wherein said apparatus further comprises:

a torque adjusting means for one of increasing and decreasing of said torque requirement gradually.

4. A vehicle drive apparatus according to claim 3, wherein said apparatus further comprises:

a torque enhancing means for enhancing said torque requirement above a value restricted by said upper limit for discharge power.

5. A vehicle drive apparatus according to claim 2, wherein said apparatus further comprises:

a torque enhancing means for enhancing said torque requirement above a value restricted by said upper limit for discharge power.

6. A vehicle drive apparatus according to claim 1, wherein said apparatus further comprises:

a torque adjusting means for one of increasing and decreasing of said torque requirement gradually.

7. A vehicle drive apparatus according to claim 6, wherein said apparatus further comprises:

a torque enhancing means for enhancing said torque requirement above a value restricted by said upper limit for discharge power.

8. A vehicle drive apparatus according to claim 1, wherein said apparatus further comprises:

a torque enhancing means for enhancing said torque requirement above a value restricted by said upper limit for discharge power.

9. A method for a vehicle drive apparatus which comprises an electricity storage reservoir and an electric motor, which is driven with electricity supplied by said electricity storage reservoir, for driving a vehicle or assisting said vehicle driven by an internal combustion engine, said method comprising the steps of:

detecting a temperature of said electricity storage reservoir;

setting an upper limit for discharge power of said electricity storage reservoir depending on said temperature;

detecting discharge power of said electricity storage reservoir;

detecting a revolution speed of said internal combustion engine or electric motor;

setting torque requirement for said electric motor depending on said revolution speed; and decreasing said torque requirement from a current torque requirement value to a new torque requirement value greater than zero when said discharge power is more than said upper limit when said internal combustion engine is started up by said electric motor.

10. A computer program for a computer of a vehicle drive apparatus which comprises an electricity storage reservoir and an electric motor, which is driven with electricity supplied by said electricity storage reservoir, for driving a vehicle or assisting said vehicle driven by an internal combustion engine, wherein said computer program executes said computer in a process comprising:

setting an upper limit for discharge power of said electricity storage reservoir depending on a temperature entered by a temperature detecting means for detecting said temperature of said electricity storage reservoir;

setting torque requirement for said electric motor depending on a revolution speed entered by a revolution speed detecting means for detecting said revolution speed of said internal combustion engine or electric motor; and decreasing said torque requirement from a current torque requirement value to a new torque requirement value greater than zero when said discharge power entered by a power detecting means for detecting said discharge power of said electricity storage reservoir is more than said upper limit, when said internal combustion engine is started up by said electric motor.

* * * * *